Patented June 2, 1953

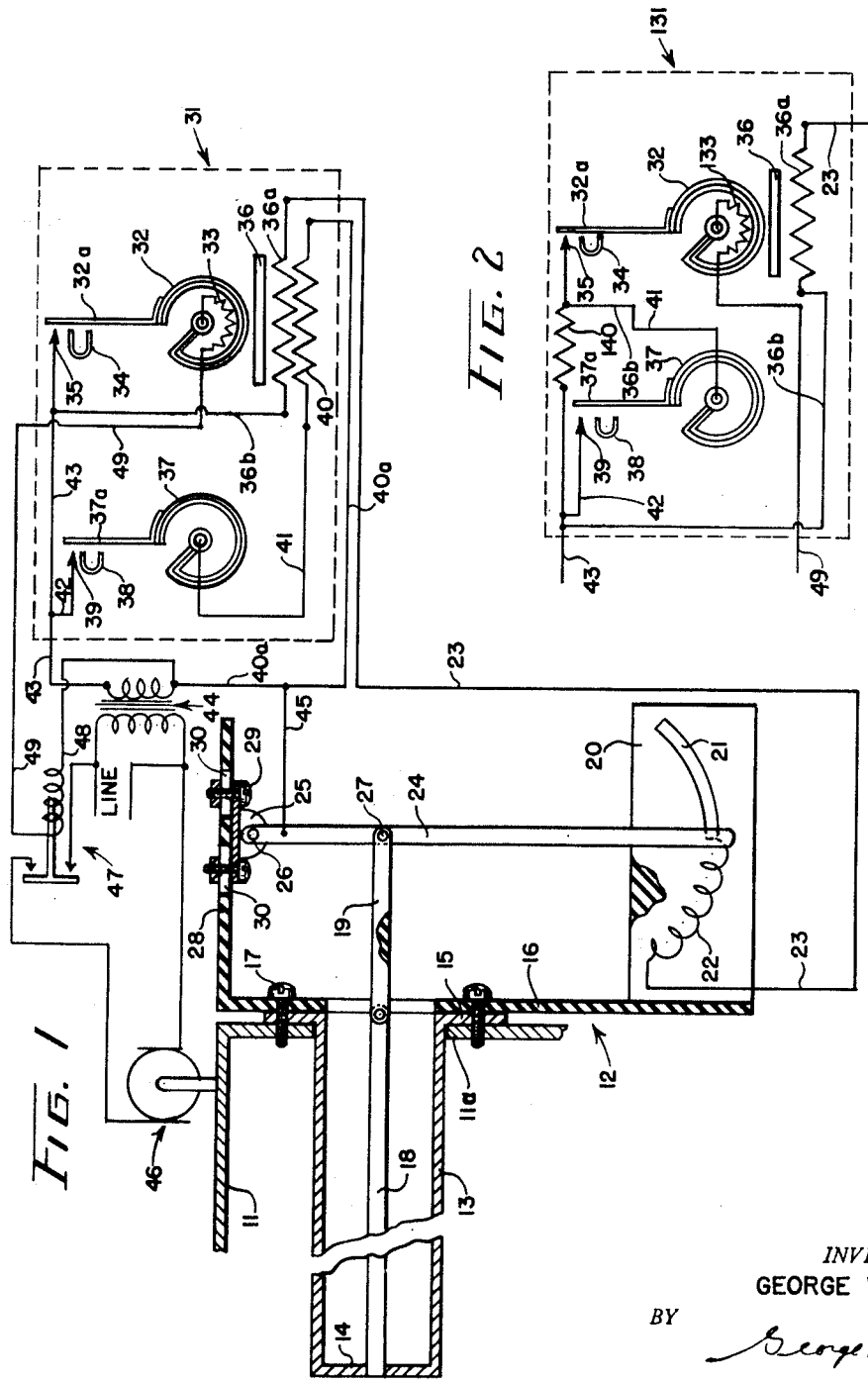

2,640,649

UNITED STATES PATENT OFFICE 2,640,649

THERMOSTATIC CONTROL APPARATUS FOR HEATING SYSTEMS

George W. Rusler, Minneapolis, Minn., assignor to Minneapolis-Honeywell Regulator Company, Minneapolis, Minn., a corporation of Delaware Application June 25, 1949, Serial No. 101,414

5 Claims. (Cl. 236—9)

This invention relates to control apparatus for use in temperature, pressure, or other condition regulating systems. More particularly, the invention relates to control apparatus comprising means for sensing conditions that tend to cause "overshooting" of the controlled condition and, therefore, having particular utility in hand-fired heating systems.

In heating systems were "steep front" or rapidly rising temperature transients often occur, and where the heat transfer means has high heat storage characteristics, overshooting of the desired temperature of the heated medium is a constant problem. Various types of control apparatus have been devised in an effort to overcome this undesired result. While many of these prior art control means have alleviated the difficulty to a certain extent, they have been complicated and expensive devices which do not overcome the difficulties to the extent desired.

While it will be apparent to those skilled in the art that most of the following remarks and described apparatus may apply to and be used in various types of heating systems, and even cooling systems by merely reversing the action of the various controls, it also will be apparent that the present invention has particular utility in the control of hand-fired coal or coke furnaces.

There are various factors in the operation of a hand-fired coal furnace that contribute to the overshooting of the desired room temperature by the heating medium circulating between the furnace and said room. Various furnace conditions, such as fire bed conditions, types of fuel being burned, firing practices, ashpit leakage, drafts, etc., affect the rate at which the heating medium (water, air, etc.) is heated and contribute to the head of heat built up before the room thermostat has had a chance to respond to the heat supplied to the room. They also determine the lag in the response of the fuel bed following cut-off by the controls. With a good draft condition and a fuel bed free of ashes, the response of said fuel bed will be rapid and the heating of the heat transfer medium will be at a rapid rate thus producing a steep front transient, graphically speaking, and generating a high head of heat before the controls respond. This is particularly true following the firing of the furnace in the morning after a lowered night temperature has been reached in the room, or after a large quantity of fuel has been placed on the fire bed. These conditions usually cause the room thermostat to call for furnace operation for an extended period of time if a conventional thermostat is used, or a large number of short operating periods if a conventional "heat anticipating" thermostat is used. The extended period of operation causes the development of a large body of hot coals in the fire bed which would continue to supply heat to the heating medium even after the controls of the system call for heat shut-off.

It is an object of this invention to provide control apparatus which will effectively anticipate the conditions which lead to overshooting in a temperature regulating system and control the system accordingly.

Another object of the invention is to provide control apparatus which is simple and inexpensive, yet sturdy and reliable in operation, to prevent overshooting of room temperatures by heating apparatus.

A further object of the invention is to provide a control device responsive to rate of temperature change for modifying the response of other control means.

Still a further object of the invention is to provide a rate responsive thermostat adapted to modify the response of a second thermostat when temperature changes of the first thermostat are positive but do not affect the second thermostat when temperature changes of the first thermostat are negative.

Another object of the invention is to provide a thermostat having means for causing different amounts of artificial heat to be generated therein at different temperatures of the medium surrounding the thermostat. This artificial heat is commonly known as "anticipating heat."

A still further object of the invention is to provide a control apparatus, which is responsive to the rate of temperature change in the heating means.

Additional objects of the invention will become apparent upon reading the following detailed description of the invention in conjunction with the accompanying drawing wherein:

Figure 1 is a schematic showing of the apparatus and control system, and

Figure 2 is a schematic showing of a modified form of the room thermostat portion of the control apparatus of Figure 1.

Referring to Figure 1 of the drawing, the numeral 11 designates the bonnet of a hot air furnace or the outer wall of a water jacket of a hot water furnace.

A control device, generally designated by the reference numeral 12 and hereinafter referred to as the bonnet controller, comprises a metallic tube 13, having a closed end 14 and an open end with an annular flange 15, which extends through an opening 11a in the bonnet. A bracket member 16, made of suitable electrically insulating material, is secured to the bonnet 11 by means of screws 17 passing through aligned holes in the bracket 16, the flange 15 and the wall 11a of the bonnet 11. A rod 18, preferably made of the same metal as the tube 13, is secured at one of its ends to an end wall 14 of the tube and, at its other end, is pivotally connected to a link 19 made of suitable electrically insulating material, for a purpose to be described hereinafter. Secured to a laterally projection portion 20 of the bracket 12 is a heavy contact bar 21 of arcuate shape. One end of this contact bar is connected to the end of a coil-type of resistance wire 22 arranged to provide a continuation of the arc formed by the member 21. The other end of the resistance coil is connected to a lead line 23 for connection to another element of the control apparatus, to be presently described. A contact arm 24 is connected to a bearing member 25 by means of a pivot 26, and is connected near said end to the other end of the link 19 by means of a pivot 27. The free end of the arm 24 bears against either the contact bar 21 or the coil 22 with sufficient pressure as to maintain a good electrical contact therewith. Bearing member 25 is adjustably secured to a second laterally projecting portion 28 of the bracket by means of bolts 25 extending through elongated slots 30 in the bracket portion 28. It will be noted that the arm 24 may be adjusted about 27 as a pivot by sliding the bolts 29 in the slots 30 so as to position the free end of the arm 24 over the junction of the contact bar 21 and the adjacent end of the resistance coil 22, the position that the arm 24 should have when the temperature of the rod 18 and the tube 13 are the same.

Due to the fact that the coefficient of expansion of the rod and tube are the same or substantially the same, it is readily apparent that, as the rod 18 will not respond quite as quickly to a change in temperature of the medium surrounding the tube 13 as the tube which is in contact with said medium, a fairly rapid rate of increase in the temperature of said medium will cause movement of the end 14, rod 18, link 19 and the free end of the arm 24 toward the left as viewed in Figure 1. Conversely, a fairly rapid decrease in the temperature of the medium surrounding the tube 13 will cause movement of the contact arm 24 in the opposite direction. The effects produced by the movement of the contact arm 24 will be described below under the heading "Operation."

A thermostat, generally designated by the reference number 31, is suitably designed for mounting in the space the temperature of which is to be controlled. It comprises a conventional snap acting bimetallic thermostatic member 32, a heater 33 associated therewith to provide artificial heat to the member 32 in a conventional manner, a permanent magnet 34 for snapping a contact arm 32a on the member 32 against a fixed contact 35 when it closely approaches it, and a conventional heater 36a for heating a heat "sponge" or mass 36 and, after a time lag, the thermostatic member 32. The thermostat 31, hereinafter referred to as the room thermostat, also has a second bimetallic thermostatic member 37, a contact arm 37a, a permanent magnet 38 and a fixed contact 39 which are similar to the members 32, 32a, 34 and 35, respectively, of the first mentioned thermostatic unit. Member 37 is calibrated to move arm 37a against contact 39 at a temperature below that at which the arm 32a contacts the fixed contact 35.

A heater resistor 40 is positioned to also heat the sponge 36 and, thus, thermostatic member 32, and is connected by lead line 41 to the fixed end of the thermostatic member 37.

The fixed contacts 35 and 39 of the thermostat are electrically connected by leads 42 and 43 to one side of the secondary of a transformer, generally designated by the reference numeral 44. The lower end of the transformer secondary is connected through lead 40a to the heater 40, which in turn is connected to the member 37 by line 41.

A second circuit, the main control circuit for the apparatus, is completed from the room thermostat member 32 through arm 32a, contact 35, line 43, the secondary of the transformer, line 48, the coil of a conventional relay 47 and line 49 back to the member 32.

A third circuit extends from the lower end of the transformer secondary through line 40a, line 45, arm 24, resistance 22, line 23, heater 36a, line 36b and line 43 back to the transformer.

The apparatus controlled by the room thermostat is a conventional, line voltage, spring return motor, generally designated by the reference numeral 46, for operating a draft damper or any other suitable combustion control. Energization of this motor is controlled by the relay 47. It is thus seen that energization of the relay and, consequently, the energization of the motor 46 are controlled by the contacts 32a and 35.

The thermostat modification shown in Figure 2 comprises substantially the same elements as the thermostat of Figure 1 with the exception that the resistance heater 40 of Figure 1 is replaced by a conventional resistor 140, positioned so as to produce no heating of either one of the bimetallic members 32 and 37. It is connected in series with a conventional thermostat heater resistor 133, of slightly different resistance than the resistor 33 of Figure 1 due to the difference in potential across it, rather than in parallel therewith, as in Figure 1. Also, the contacts 37a and 39 are in shunt relationship with the resistor 140 rather than in series therewith, as in Figure 1. The resistance 140 is positioned between line 43 and fixed contact 35 and thus in series with the resistor 33. Any other series position of the resistor 140 would be permissible so long as the contacts 37a and 39 are able to short out said resistor when said contacts close. The functions performed by this modification of the room thermostat as well as the functions performed by the modification of Figure 1, will be more clearly understood upon reading the following description of the operation of the above described control apparatus.

*Operation*

The apparatus is shown in its satisfied condition, that is, with the room at a temperature sufficient to have the bimetallic members 32 and 37 in their contact open positions. Should the temperature drop sufficiently so that contact arm 32a moves into engagement with contact 35, the relay 47 and, consequently, the motor 46, will become energized by a circuit completed from the top of the secondary coil of the transformer 44 through line 43, contacts 35 and 32a, member 32, heater 33, line 49, relay 47 and line 48 back to the other side of the transformer's secondary coil. This will cause movement of a draft damper (not shown) to a position which causes the furnace to burn fuel at a higher rate and thus to increase the supply of heat to the heating medium which in turn supplies additional heat to the atmosphere surrounding the thermostat 31.

Assuming that the operating differential of the thermostat 32 is two degrees and that the artificial heat generated by the heater 33 is three degrees, the temperature of the room would not have to rise to periodically cause the contacts 32a and 35 to make and break, and thus cause the periodic supplying of heat to maintain steady heating of the room. This arrangement is well known in the art, so will not be described in any more detail.

Should the condition of the furnace be such that the rate of temperature rise is very high, the rod and tube of the bonnet controller will operate to move the contact arm 24 toward the left, over the resistance coil 22, so as to reduce the resistance thereof and thus increase the current flow through the heater 36a. The heater 36a, which supplies practically no heat to the sponge when the arm 24 rests on the right hand end of coil 22 or on bar 21, will then increase the "heat anticipation" of the thermostat by delivering more heat into the thermostatic element 32 through sponge 36. This will cause opening of the contacts 32a and 35 at a lower room temperature than that caused by the conventional heat anticipation provided by heater 33. In this manner, the danger of overshooting of the room temperature, caused by a rapidly increasing rate of heating of the heating medium is materially reduced. The sponge provides a heat transfer delay between heater 36a and bimetal member 32 so as continue the supply of anticipating heat to the member 32 when the room temperature closely approaches the cut-off temperature.

Should the condition of this furnace be such that the call for heat by the thermostat only causes the furnace to increase its heat output at a very slow rate, so that the rod 13 responds to the temperature of the surrounding medium of the tube 13 substantially as fast as the tube 13, the contact arm 24 will remain in its normal position and no additional anticipating heat will be supplied to the thermostat 31. Since there will be no appreciable build-up of residual heat in the furnace to be supplied to the room after the room thermostat has opened the normal anticipating means 31 will provide adequate control.

An abnormal heat demand is most likely to occur in the morning, after a night shutdown or setback, when the thermostat is adjusted to call for normal daytime operation, or when there has been a considerable drop in the temperature of the room in which the thermostat is located. Under either one of these conditions, not only will the contacts 32a and 35 be closed but also the contacts 37a and 39 will be closed. This will cause the supplying of additional heat to the thermostat 32 due to the energization of the heater 40 in parallel with the energization of heater 36a from the transformer, through line 43, line 42, contacts 39, 37a, bimetallic member 37, lead 41, the heater 40 and line 40a back to the transformer. The energization of heater resistor 40 will thus shift the control range for the opening and closing of contacts 35 and 32a downwardly by the amount of heat artificially supplied to the thermostatic member 32 through the sponge 36.

It will thus be seen that the contacts 32a and 35 will break at a lower temperature than it normally would under the influence of the heaters 33 and 36a only. Therefore, the head of heat built up in the furnace due to the large number of coals that have been ignited by an exceptionally long period of furnace operation, when transmitted to the room will not cause overheating thereof but merely overshooting of the automatically lowered control temperature sufficiently to bring the room temperature to the desired level. It will be noted in this arrangement that as the room temperature rises so as to cause the breaking of contacts 37a and 39, the heater resistor 40 will be deenergized thus shifting the control range of the room thermostat 31 upwardly to that provided by the heaters 33 and 36a only. In this manner, the undesired overshooting, brought about by a long period of operation of the furnace, is effectively overcome by checking the build-up of the furnace fuel bed heat output while bringing the room temperature from a very low temperature to the normal control range.

From the above description of the operation of the apparatus of this invention, it is seen that no matter what the operating condition of the furnace is, and no matter what the heat load is, the control apparatus functions in a manner that overheating of the room above a preselected temperature is effectively reduced or prevented. Under certain obvious circumstances the bonnet controller and thermostatic member 37 will operate simultaneously to cause the greatest amount of heat to be supplied to member 32.

The operation of the control apparatus, with the room thermostat 131 substituted for the room thermostat 31, differs from that described above in that the lower limit of the cycling range is shifted downwardly when contacts 39 and 37a close to short out the resistance 140. With a lower resistance in the circuit, the heater 133 will supply more heat to the bimetallic member 32 and thus provide greater "heat anticipation" at the lower room temperature, as in the modification of Figure 1.

As indicated above, the above described control apparatus is adapted for use in various types of heat regulating apparatus and systems and it is therefore to be understood that the above description of the control apparatus as being applied to a hand-fired coal furnace, is merely by way of illustration rather than of limitation. Furthermore, as it will be apparent to those skilled in the art that various modifications of the above described apparatus may be made without departing from the spirit of the invention, it is desired that the scope of the invention be determined solely from the appended claims.

I claim as my invention:

1. Apparatus of the type described comprising means responsive to a rate of temperature change, said means having a rod and tube actuated potentiometer, said potentiometer having a coiled resistor connected at one of its ends to a contact bar and a wiper arm normally engaging their junction and movable over said resistor upon temperature rise and said bar upon temperature fall, a thermostat, and an electric heater for said thermostat connected to said potentiometer at the other end of said resistor for regulation thereby.

2. A controller comprising a potentiometer having a resistor coil joined to a contact bar and a movable contact arm positioned to move along said coil and bar, a rod and tube temperature sensing member responsive to rate of temperature change, and power transmitting means between said member and said arm for normally holding said arm at the junction of said coil and bar when the temperature around said temperature sensing member is steady and for moving said arm in a resistance reducing direction on said coil and bar when the temperature of the medium surrounding said member is increasing.

3. A controller comprising a potentiometer having a resistor joined to a contact bar and a movable contact arm positioned to move along said resistor and bar, a temperature sensing member responsive to rate of temperature change, and power transmitting means between said member and said arm for normally holding said arm at the junction of said resistor and bar when the surrounding temperature is unchanging and for moving said arm in a resistance reducing direction on said resistor and bar when the temperature of the medium surrounding said member is increasing.

4. A controller comprising a potentiometer having a resistor joined to a contact bar and a movable contact arm positioned to move along said resistor and bar, a temperature sensing member responsive to rate of temperature change, and power transmitting means between said member and said arm for normally holding said arm at the junction of said resistor and bar when the surrounding temperature is steady and for moving said arm in a resistance varying direction on said resistor and bar when the temperature of the medium surrounding said member is changing.

5. In combination, control means responsive to rate of temperature change, said means having a resistance coil and a contact bar joined together to form a variable resistor and a contact member normally in engagement with the junction of said coil and bar movable with respect to said resistor and resistance coil to vary the resistance of said means, and a temperature responsive means having contacts and a resistance heater for supplying heat to said temperature responsive means, said resistance coil being connected in series with said heater for varying the energization thereof in proportion to the rate of temperature rise.

GEORGE W. RUSLER.

References Cited in the file of this patent

UNITED STATES PATENTS

| Number | Name | Date |
| --- | --- | --- |
| 1,788,678 | Knaak | Jan. 13, 1931 |
| 2,136,753 | Penn | Nov. 15, 1938 |
| 2,181,427 | Grant | Nov. 28, 1939 |
| 2,261,343 | De Florez et al. | Nov. 4, 1941 |
| 2,280,353 | Ray | Apr. 21, 1942 |
| 2,332,212 | Fillo | Oct. 19, 1943 |
| 2,420,043 | Johnson | May 6, 1947 |
| 2,425,993 | Crise | Aug. 19, 1947 |

FOREIGN PATENTS

| Number | Country | Date |
| --- | --- | --- |
| 664,699 | France | Apr. 29, 1929 |